May 13, 1969   A. T. KORNYLAK   3,443,674
ROLLERWAY AND ROLLER THEREFOR
Filed Nov. 8, 1967

INVENTOR.
ANDREW T. KORNYLAK
BY
C Chandlee Pidgeon
AGENT.

3,443,674
ROLLERWAY AND ROLLER THEREFOR
Andrew T. Kornylak, 400 Heaton St.,
Hamilton, Ohio 45011
Continuation-in-part of application Ser. No. 550,746,
May 17, 1966, which in turn is a continuation-in-
part of application Ser. No. 392,222, Aug. 26,
1964. This application Nov. 8, 1967, Ser. No.
686,367
Int. Cl. B65g 13/00
U.S. Cl. 193—37                    14 Claims

ABSTRACT OF THE DISCLOSURE

A rollerway comprising channels firmly secured together by spacing bolts lying in spaced parallel planes. The bolts in the upper plane support rollers having elastomeric tires thereon to compensate for unevenness of the surfaces traveling thereon. The tires are molded on the rollers and have a flange fitted in a congruent groove in the roller to provide a firm fastening.

---

This application is a continuation-in-part of my prior application Ser. No. 550,746, filed May 17, 1966, now abandoned, which application was a continuation-in-part of my copending application Ser. No. 392,222, now abandoned.

This invention relates to a rollerway, and more particularly to a rollerway for a roller conveyor adapted to handle heavy loads, such as heavily loaded pallets.

An object of this invention is to provide a rollerway made up in sections adapted to be joined end to end to form the desired conveyor.

Another object of this invention is the provision of a rollerway section having relatively small rollers and capable of handling heavily loaded pallets.

A further object of this invention is the provision of a rollerway having closely spaced staggered rollers.

Another object of this invention is the provision of a small diameter roller, adapted to handle heavy loads, having a yieldable tread to compensate for unevenness of the surface traveling thereover.

A further object of this invention is the provision of a conveyor roller for the speed control of heavy loads by utilizing rollers having high hysteresis properties.

For a complete disclosure of this invention, reference is made to the following specification taken with the accompanying drawings.

In the drawings wherein like characters of reference indicate like parts throughout the several figures.

Figure 1:
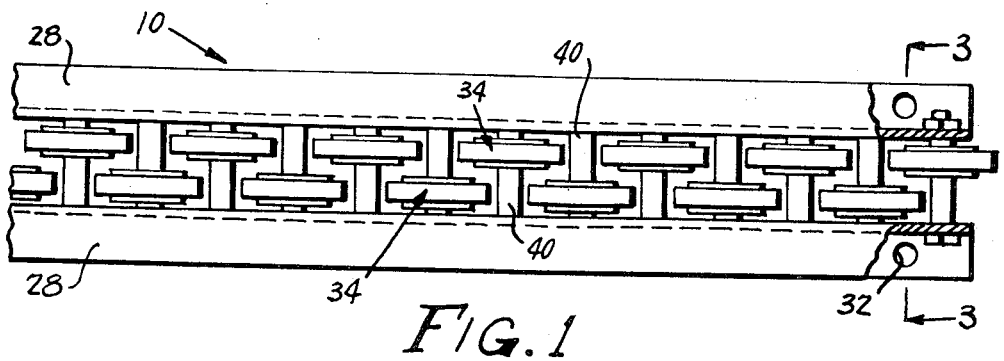
FIG. 1 is a top plan view, partly in section of a portion of a rollerway section according to this invention.
Figure 2:
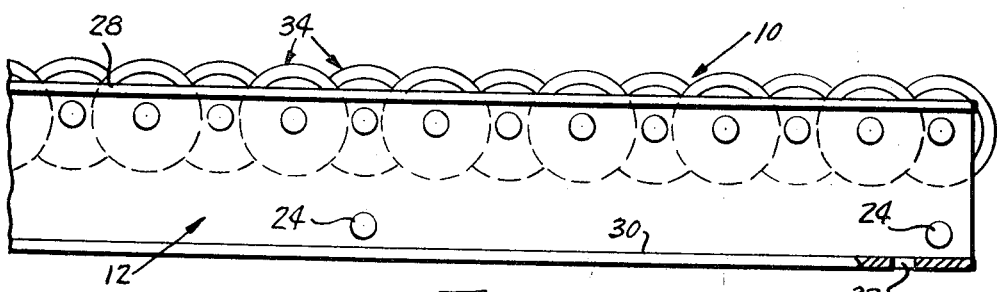
FIG. 2 is a side elevation, partly in section.
Figure 3:
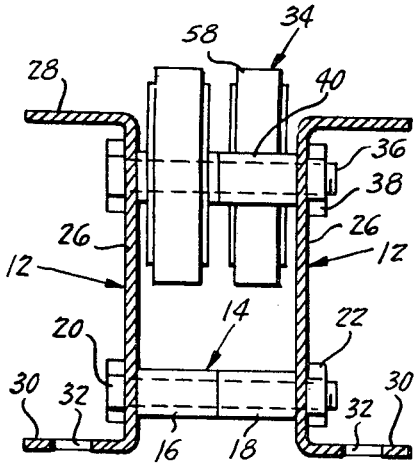
FIG. 3 is a section on the line 3—3 of FIG. 1.
Figures 4, 5:
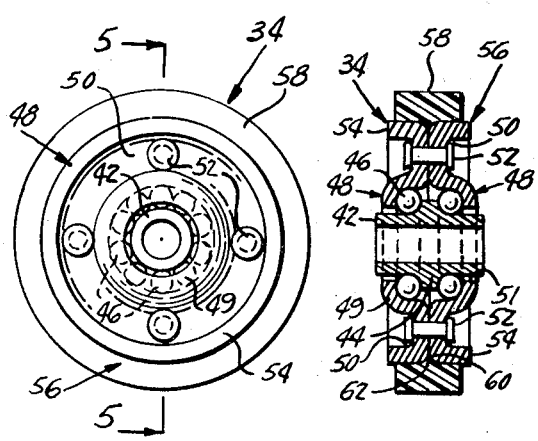
FIG. 4 is an elevation of a roller.
FIG. 5 is a vertical section through the roller of FIG. 4.
Figure 6:
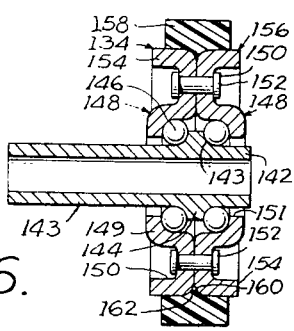
FIG. 6 is a section through a modified form of roller.

The roller disclosed in my Patent No. 3,057,448, issued Oct. 9, 1962, was capable of handling heavy loads, but had to be rather large and heavy. The roller to be described herein is smaller and lighter, and is equally able to handle very heavy loads. The bottoms or skids of a pallet often become rough and uneven and cannot operate efficiently on rollerways of usual construction. The rollerway of this invention overcomes these difficulties.

Referring now to the drawings wherein the rollerway 10 includes a pair of like channel members 12 allochirally arranged, and spaced apart by means of a plurality of sleeves 14, comprised of two cylindrical members 16, 18. Bolts 20 having nuts 22 pass through the sleeves 14 and through suitable openings 24 in the bottom walls 26 of the channel members 12. The channel members 12 have top and bottom flanges respectively 28 and 30. Adjacent either end of the flanges 30 are suitable openings 32 for use in assembling sections of the rollerway on a suitable support.

In one form of the invention, the rollers 34 are mounted on suitable bolts 36 having nuts 38. The rollers 34 are arranged in parallel rows, and in staggered relation. Each roller has, to one side thereof, a sleeve 40 through which the bolt 36 passes. There is an allochiral arrangement here, so that the sleeves 40 on the rollers 34 of one row extend between the rollers 34 of the other row. The rollers 34 of each row are spaced apart just enough to clear the sleeves 40. The sleeves 40 may be identical with the sleeves 16, 18 heretofore mentioned.

Each roller 34 has an axial bushing or hub portion 42 having a circumferential ridge 44 on either side of which are balls 46. The web of the roller comprises two like discs 48 having dish shaped midportions 49 enclosing the balls 46 and having web portions 50 fastened together with rivets 52, and having out-turned flanges 54 forming a rim 56. Each disc 48 has an opening 51 to accommodate the hub 42. A tire 58 of tough slightly resilient elastomeric material having a Shore durometer hardness of from 60 to 85A is molded on the rim 56. This tire 58 is resilient enough to yield under slight irregularities of the surface passing thereover, such as the skids of a pallet, and tough enough to stand the weight of heavily loaded pallets. Due to the slightly rounded corner where the flanges 54 are bent over, there is a small depression 60 into which some of the elastomeric material flows to assist in retaining the tire in place, by means of the ridge 62.

The rollers of this invention provide a controlled restraint of the load thereon without involving separate and complicated mechanical devices. This is obtained by virtue of a high hysteresis property of the elastomeric material of which the tires 58, 158 are formed. They absorb energy by deformation and convert it into heat rather than store the energy purely elastically. The elastomeric material of the tires 58, 158 must therefore have a poor resilience or a low coefficient of restitution.

In the operation of a gravity conveyor having elastomeric rollers, a load traveling thereover deforms the roller in the manner of a rigid surface engaging a resilient tire in rolling contact. Where the tire is perfectly elastic, all the energy stored up in any small element, as it is deformed by impact with the rigid body, is given up again as the element returns to its original shape. The roller 48 or 148 according to this invention has an inherent "deadness" so that it offers a smooth but yielding resistance to the load.

In another form of the invention, I provide a roller 134 mounted on a hub 142 having a circumferential ridge 144, with fillets 143 forming races for bearings 146. The body of the roller comprises two identical plates 148 having dish shaped midportions 149 and being allochirally arranged to provide races for the bearings 146, and web portions 150 fastened together with rivets or the like 152. The outer ends of the web portions 150 have outturned flanges 154, forming a rim 156. Each disc 148 has an opening 151 to accommodate the hub 142. A tire 158 of tough slightly resilient elastomeric material having a Shore durometer hardness of from 60 to 85A is mounted on the rim 156. This tire is resilient enough to yield under slight irregularities of a surface passing thereover, but tough enough to withstand the weight of heavily loaded pallets.

In this second form of the invention, the hubs 142 are extended to one side as at 143 so that the total length is substantially equal to the distance between the channels 12. This avoids the use of the spacers 40. Where the flanges 154 are bent over, there is a slight curve between a flange 154 and web 150 forming a small groove 160. When the tire 158 is molded over the rim 156, a portion 162 of the tire flows into this groove which aids in anchoring the tire to the rim 156.

The rollerways of this invention have normally handled pallets having loads of around 4,000 lbs, which are well beyond the capacity of the rollerways of my Patent No. 3,057,448 and the roller recited therein. They are regularly about 2¼ inches in diameter, ½ inch thick and have tires of about 3/16 inch in thickness, whereas the former rollers were about 3 inches in diameter and 1¼ inches thick. The total thickness of the tire was about 7/8 inch. It is therefore clear that the new rollers are much more efficient, and are more economical to manufacture.

In the handling of loads such as those mentioned above, it has been found necessary to control the speed of a load passing over the rollers. Metal rollers or very hard rollers will not do this. For this purpose, either brakes must be used or a roller should be used that will yield under the load, so that the constant flattening of the roller surface tends to brake the load. With ordinary elastomeric materials such distortion persists too long and smooth operation does not occur. Another factor is the uneven wear on pallets. The skids become rough and splintered so that rough and uneven operation occurs when very hard rollers are used, and poor, uneven operation occurs with softer elastomeric materials. The rollers of this invention overcome the above objections and allow smooth movement of heavily loaded pallets thereover. The rollers are specifically designed to absorb energy from a load as it rolls down over a conveyor. Each time a roller of this invention is contacted, it is deformed which causes a slowing of the load, but due to the high hysteresis properties of the elastomeric tire, the roller returns almost immediately to its original shape. It is to be noted that this energy absorption takes place only when the roller is in motion. If a load is held back for an appreciable length of time, when released, it starts to move immediately because there is no smashing or severe deformation of the roller. It is found that a roller having a rigid core and a tough elastomeric tire having high hysteresis properties is the best for the purposes of the present invention.

Having now described my invention in a preferred form, I desire it to be understood that changes and modifications may be made within the skill of the art and the scope of the appended claims.

I claim:

1. A roller for a conveyor rollerway comprising a hub, discs having inwardly facing dished midportions and planar outer portions, antifriction bearings between said discs and said hub in said dished portions, said discs being joined adjacent their outer peripheries, the outer ends of said discs having outwardly turned flanges defining a peripheral groove therebetween, and a tough elastomeric tire molded on said flanges and having a flange fitted in the groove.

2. The structure as defined in claim 1, wherein the tire has a Shore durometer hardness of from 65A to 85A.

3. The structure as defined in claim 1, wherein the tire is of a material having a low coefficient of restitution.

4. A rollerway for a heavy duty conveyor structure comprising spaced structural members having substantially vertical web members, means spacing and securing said web members in parallel planes, said means comprising a plurality of securing members passing through openings in each web and arranged in parallel planes, sleeve means between the webs surrounding the securing means in one of said planes, and allochirally arranged rollers mounted on the securing means in the other plane.

5. A device as defined in claim 4 wherein each roller comprises a hub mounted on the securing means and sleeve means mounted between the hub and web.

6. A device as defined in claim 4 wherein each roller comprises a hub having an integral elongated sleeve mounted on the securing means.

7. The structure as defined in claim 4, wherein each roller comprises a hub and a core having a cylindrical outer rim and an elastomeric tire mounted on said rim.

8. The structure as defined in claim 7, wherein the tire has a Shore durometer hardness of from 65A to 85A.

9. The structure as defined in claim 7, including antifriction bearings between the hub and the core.

10. The structure as defined in claim 9, wherein the core has outwardly turned flanges define a peripheral groove therebetween and the elastomeric tire is molded on said flanges and has a flange fitted in the groove.

11. The structure according to claim 7, wherein the tire has high hysteresis properties.

12. In a conveyor rollerway comprising a pair of spaced allochirally arranged structural members having two series of longitudinally spaced rollers therebetween wherein the rollers of one series are staggered longitudinally with respect to those of the other series to provide interdigitated series of rollers, the improvement wherein the rollers each comprises an axial bushing, a pair of dished allochirally arranged plates, antifriction bearing means between said bushing and said plates, said plates each having an outwardly turned peripheral flange, means uniting said plates intermediate the flange and the bushing, a groove in the periphery of the roller between the peripheral flanges, a tough elastomeric tire molded on the periphery of said roller and having a portion extending into said groove.

13. The structure according to claim 12, wherein the elastomeric tire has a Shore durometer hardness of from 65A to 85A.

14. The structure according to claim 12, wherein the elastomeric tire has high hysteresis properties.

References Cited

UNITED STATES PATENTS

| | | | |
|---|---|---|---|
| 799,699 | 9/1905 | Winter | 193—35 |
| 1,111,474 | 9/1914 | Lenfestey | 193—37 |
| 2,729,321 | 1/1956 | Morrison | 193—35 |
| 2,923,391 | 2/1960 | Hewitt | 193—35 |
| 3,198,411 | 8/1965 | Cope | 193—37 |
| 3,262,538 | 7/1966 | Englander | 193—36 |

ANDRES H. NIELSEN, *Primary Examiner.*